United States Patent
Shindo et al.

(10) Patent No.: US 10,629,907 B2
(45) Date of Patent: Apr. 21, 2020

(54) LITHIUM ION SECONDARY BATTERY AND METHOD FOR PRODUCING THE SAME

(71) Applicant: TOYOTA JIDOSHA KABUSHIKI KAISHA, Toyota-shi, Aichi-ken (JP)

(72) Inventors: Yohei Shindo, Susono (JP); Yoichi Koike, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 15/715,772

(22) Filed: Sep. 26, 2017

(65) Prior Publication Data
US 2018/0102540 A1  Apr. 12, 2018

(30) Foreign Application Priority Data
Oct. 7, 2016  (JP) ................ 2016-199217

(51) Int. Cl.
| | |
|---|---|
| *H01M 4/58* | (2010.01) |
| *H01M 4/136* | (2010.01) |
| *H01M 4/131* | (2010.01) |
| *H01M 4/1391* | (2010.01) |
| *H01M 4/505* | (2010.01) |
| *H01M 4/02* | (2006.01) |
| *H01M 4/62* | (2006.01) |
| *H01M 10/42* | (2006.01) |
| *H01M 4/36* | (2006.01) |
| *H01M 4/525* | (2010.01) |
| *H01M 10/0525* | (2010.01) |

(52) U.S. Cl.
CPC ......... *H01M 4/5825* (2013.01); *H01M 4/131* (2013.01); *H01M 4/136* (2013.01); *H01M 4/1391* (2013.01); *H01M 4/364* (2013.01); *H01M 4/628* (2013.01); *H01M 10/4235* (2013.01); *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2007/0082265 A1 | 4/2007 | Itou et al. | |
|---|---|---|---|
| 2010/0102270 A1* | 4/2010 | Jia ........................ | C01B 25/37 252/182.1 |

(Continued)

FOREIGN PATENT DOCUMENTS

| JP | H10-154532 A | 6/1998 |
|---|---|---|
| JP | 2005-190996 A | 7/2005 |

*Primary Examiner* — Rena Dye Cronin
(74) *Attorney, Agent, or Firm* — Oliff PLC

(57) ABSTRACT

A lithium ion secondary battery with a high capacity retention rate, and a method for producing the lithium ion secondary battery. The lithium ion secondary battery may comprise a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, wherein a C1s element ratio obtained by X-ray photoelectron spectroscopy measurement of the $Li_3PO_4$ is 18.82 at % or less.

7 Claims, 1 Drawing Sheet

(56) References Cited

U.S. PATENT DOCUMENTS

2015/0013499 A1* 1/2015 Asano ................ C22B 3/0005
                                                        75/739
2016/0217984 A1* 7/2016 Polcik ............... C23C 14/3414
2017/0040601 A1* 2/2017 Nakayama .......... H01M 4/366

* cited by examiner

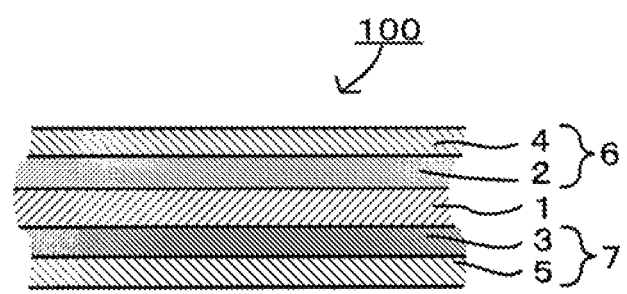

LITHIUM ION SECONDARY BATTERY AND METHOD FOR PRODUCING THE SAME

TECHNICAL FIELD

The disclosure relates to a lithium ion secondary battery and a method for producing the same.

BACKGROUND

Cathode-focused research has been carried out to increase the performance of a lithium ion secondary battery comprising an electrolyte and an anode, the electrolyte being an electrolytic solution of a lithium salt dissolved in a solvent, and the anode being a material that can occlude and release lithium (e.g., a carbonaceous material).

For example, Patent Literature 1 discloses an organic liquid electrolyte secondary cell that is capable of, due to incorporation of a phosphate compound (e.g., lithium phosphate) in the positive electrode, preventing electrochemical decomposition of the organic liquid electrolyte when the cell is subject to supercharging, and preventing a rapid increase in the internal pressure of the cell and/or an abnormal increase in the temperature of the cell.

Patent Literature 2 discloses that decomposition of an electrolysis solution can be suppressed by depositing a lithium compound (lithium phosphate) on the surface of a lithium nickel oxide used as a positive electrode active material.

Patent Literature 1: Japanese Patent Application Laid-Open (JP-A) No. 1998-154532

Patent Literature 2: JP-A No. 2005-190996

A lithium ion secondary battery comprising a cathode containing the phosphoric acid compound disclosed in Patent Literature 1 or 2, has a problem of low capacity retention rate.

SUMMARY

The disclosed embodiments were achieved in light of the above circumstance. An object of the disclosed embodiments is to provide a lithium ion secondary battery with a high capacity retention rate and a method for producing the lithium ion secondary battery.

To achieve the above object, in a first embodiment, there is provided a lithium ion secondary battery comprising a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, wherein a C1s element ratio obtained by X-ray photoelectron spectroscopy measurement of the $Li_3PO_4$ is 18.82 at % or less.

In the lithium ion secondary battery, a content of the $Li_3PO_4$ in the cathode active material layer may be from 0.1 to 10 parts by mass with respect to 100 parts by mass of the cathode active material.

In the lithium ion secondary battery, the $Li_3PO_4$ may be particles having an average particle diameter of 100 nm or more and 20 μm or less.

In the lithium ion secondary battery, the liquid electrolyte may contain a non-aqueous solvent.

To achieve the above object, in another embodiment, there is provided a method for producing a lithium ion secondary battery comprising a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, the method comprising: a high-humidity treatment step in which the $Li_3PO_4$ containing an impurity carbonate is prepared and the impurity carbonate is subjected to a hydrolysis treatment in a high-humidity chamber, and a battery assembly step in which the lithium ion secondary battery is assembled after the high-humidity treatment step.

In the method for producing the lithium ion secondary battery, the hydrolysis treatment may be carried out for 25 to 40 hours in the high-humidity treatment step.

In the method for producing the lithium ion secondary battery, the hydrolysis treatment may be carried out in the high-humidity chamber at a temperature of 60° C. or more and 120° C. or less and a humidity of 90% or more in the high-humidity treatment step.

In the method for producing the lithium ion secondary battery, the $Li_3PO_4$ may be particles having an average particle diameter of 100 nm or more and 20 μm or less.

In the method for producing the lithium ion secondary battery, a C1s element ratio obtained by X-ray photoelectron spectroscopy measurement of the $Li_3PO_4$ after the high-humidity treatment step, may be 18.82 at % or less.

In the method for producing the lithium ion secondary battery, the liquid electrolyte may contain a non-aqueous solvent.

In the method for producing the lithium ion secondary battery, the method may comprise a cathode preparation step in which the cathode is prepared by mixing the $Li_3PO_4$ with the cathode active material after the high-humidity treatment step and before the battery assembly step.

In the method for producing the lithium ion secondary battery, a content of the $Li_3PO_4$ in the cathode active material layer may be from 0.1 to 10 parts by mass with respect to 100 parts by mass of the cathode active material.

According to the disclosed embodiments, the lithium ion secondary battery with a high capacity retention rate and the method for producing the same, can be provided.

BRIEF DESCRIPTION OF THE DRAWING

FIG. 1 is a sectional view of a schematic configuration of the lithium ion secondary battery of the disclosed embodiments.

DETAILED DESCRIPTION

In the disclosed embodiments, "lithium ion secondary battery" means a secondary battery that can be charged and discharged by charge transfer involved in lithium ion transfer between the cathode and anode.

Also in the disclosed embodiments, "active material" means a substance that can reversibly occlude and release (typically, insert and extract) a chemical species that serves as a charge carrier in a secondary battery, such as a lithium ion.

Also in the disclosed embodiments, unless otherwise noted, "SOC" means the state of charge of a secondary battery which is on the basis of a voltage range the secondary battery generally uses.

Also in the disclosed embodiments, "particle" may be either primary particle or secondary particle.

1. Lithium Ion Secondary Battery

The lithium ion secondary battery of the disclosed embodiments is a lithium ion secondary battery comprising a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, wherein a C1s element ratio obtained by X-ray photoelectron spectroscopy measurement of the $Li_3PO_4$ is 18.82 at % or less.

A lithium ion secondary battery comprising a spinel-structured compound (e.g., $LiNi_{0.5}Mn_{1.5}O_4$) as a cathode active material, has a problem of deterioration in durability due to oxidative decomposition of the liquid electrolyte.

Since the decomposition of the liquid electrolyte can be inhibited by adding a small amount of lithium phosphate ($Li_3PO_4$) to the cathode, a chemical reaction can be inhibited in the battery, or an increase in the battery temperature which is caused by a chemical reaction can be slow. As a result, a rapid increase in the internal pressure of the battery and/or a rapid increase in the temperature of the battery can be inhibited. However, the lithium ion secondary battery comprising the cathode containing a small amount of lithium phosphate, has a problem of low capacity retention rate.

A commercially-available $Li_3PO_4$ contains a slight amount of carbonate (e.g., lithium carbonate ($Li_2CO_3$)) as an impurity. At the time of initial charging, the carbonate is decomposed and dissolved earlier than the $Li_3PO_4$ and deposited on the surface of the cathode active material or a conductive material. Therefore, it is considered the $Li_3PO_4$ dissolved later than the carbonate is prevented from being deposited on the surface of the cathode active material or conductive material. As a result, it is considered that the capacity retention rate of the battery decreases.

It was found that the capacity retention rate of the battery is increased by placing the $Li_3PO_4$ in a high-humidity chamber in advance, hydrolyzing the carbonate, which is an impurity, to reduce the carbonate contained in the $Li_3PO_4$, and then adding the $Li_3PO_4$ to the cathode active material layer.

Also, it was found that the capacity retention rate of the battery is increased by incorporating, in the cathode, such $Li_3PO_4$ that the C1s element ratio obtained by XPS measurement is 18.82 at % or less.

It is considered that the capacity retention rate of the battery is increased since the amount of the carbonate, which is an impurity, is small in the $Li_3PO_4$ that the C1s element ratio obtained by XPS measurement is 18.82 at % or less, and the carbonate is less likely to disturb the deposition of the $Li_3PO_4$.

FIG. 1 is a view of an example of the lithium ion secondary battery of the disclosed embodiments, and it is also a schematic view of a section cut in the laminating direction. The lithium ion secondary battery of the disclosed embodiments is not limited to this example.

A lithium ion secondary battery 100 comprises a cathode 6 including a cathode active material layer 2 and a cathode current collector 4, an anode 7 including an anode active material layer 3 and an anode current collector 5, and an electrolyte layer 1 being disposed between the cathode 6 and the anode 7.

Hereinafter, the cathode, anode and electrolyte layer used for the lithium ion secondary battery of the disclosed embodiments, will be described in detail. Also, a separator and a battery casing that are preferably used for the lithium ion secondary battery of the disclosed embodiments, will be described in detail.

The cathode includes the cathode active material layer comprising the cathode active material and the $Li_3PO_4$. In addition to the cathode active material layer, the cathode generally includes a cathode current collector and a cathode lead connected to the cathode current collector.

The C1s element ratio obtained by XPS measurement of the lithium phosphate ($Li_3PO_4$) contained in the cathode active material layer, is 18.82 at % or less. The element ratio is preferably as small as possible.

The C1s element in the $Li_3PO_4$ is derived from the impurity carbonate. A common, commercially-available product of $Li_3PO_4$ contains impurity carbonate. Therefore, the C1s element ratio obtained by XPS measurement of the commercially-available product of $Li_3PO_4$, is not 18.82 at % or less (see Comparative Example 1). A method for controlling the C1s element ratio obtained by XPS measurement of the commercially-available product of $Li_3PO_4$ to 18.82 at % or less, is carrying out a high-humidity treatment on the commercially-available product of $Li_3PO_4$. The high-humidity treatment is as described below.

An X-ray photoelectron spectrometer can be used for the X-ray photoelectron spectroscopy (XPS) measurement. The X-ray source may be an AlKα x-ray source.

The content of the lithium phosphate in the cathode active material layer included in the cathode, is not particularly limited. It may be 0.1 part by mass or more and 10 parts by mass or less, with respect to 100 parts by mass of the cathode active material. Since the content is 0.1 part by mass or more, desired liquid electrolyte decomposition inhibiting ability is easily obtained. Since the content is 10 parts by mass or less, it is easy to keep desired battery performance.

The form of the lithium phosphate is not particularly limited. The lithium phosphate is preferably in the form of particles from the point of view that the liquid electrolyte decomposition inhibiting ability of the lithium phosphate increases as the surface area thereof increases. When the lithium phosphate is in the form of particles, the average particle diameter of the lithium phosphate particles is not particularly limited. It may be 100 nm or more and may be 20 μm or less. Since the average particle diameter is 100 nm or more, desired liquid electrolyte decomposition inhibiting ability is easily obtained. Since the average particle diameter is 20 μm or less, it is easy to obtain an ion conducting path between the electrodes, and it is easy to keep desired battery performance.

In the disclosed embodiments, unless otherwise noted, "average particle diameter" means a median diameter (50% volume average particle diameter; hereinafter, it may be referred to as "D50") derivable from a particle size distribution measured with a laser scattering/diffraction particle size distribution analyzer.

As the cathode active material, examples include, but are not limited to, $LiNi_{0.5}Mn_{1.5}O_4$, $LiCoO_2$, $LiNi_{1/3}Mn_{1/3}Co_{1/3}O_2$, $LiNiO_2$, $LiMn_2O_4$, $LiCoMnO_4$, $Li_2NiMn_3O_8$, $LiCoPO_4$, $Li_3Fe_2(PO_4)_3$ and $Li_3V_2(PO_4)_3$.

The form of the cathode active material is not particularly limited. The cathode active material may be in the form of particles. When the cathode active material is in the form of particles, the average particle diameter of the cathode active material particles may be from 1 to 20 μm. This is because poor handleability may be obtained when the average particle diameter of the cathode active material particles is too small, and it may be difficult to obtain a flat cathode active material layer when the average particle diameter of the cathode active material particles is too large.

The content ratio of the cathode active material in the cathode active material layer is generally from 50 to 90% by mass, when the total mass of the cathode active material layer is determined as 100% by mass.

As needed, the cathode active material layer may contain a conductive material, a binder, etc.

The conductive material is not particularly limited, as long as it can increase the electroconductivity of the cathode active material layer. As the conductive material, examples include, but are not limited to, carbon black such as acetylene black and Ketjen Black, carbon nanotubes (CNT) and carbon nanofibers (CNF). The content ratio of the conductive material in the cathode active material layer varies depending on the type of the conductive material. It is generally from 1 to 30% by mass, when the total mass of the cathode active material layer is determined as 100% by mass.

As the binder, examples include, but are not limited to, polyvinylidene fluoride (PVdF), polytetrafluoroethylene (PTFE), butylene rubber (BR) and styrene-butadiene rubber (SBR). The content ratio of the binder in the cathode active material layer may be such a content ratio that can fix the cathode active material, etc. The content ratio of the binder is generally from 0.5 to 10% by mass, when the total mass of the cathode active material layer is determined as 100% by mass.

The thickness of the cathode active material layer varies depending on the intended application of the battery, etc. It may be from 10 to 250 µm, from 20 to 200 µm, or from 30 to 150 µm.

The cathode current collector functions to collect current from the cathode active material layer. As the raw material for the cathode current collector, examples include, but are not limited to, aluminum, SUS, nickel, chromium, gold, zinc, iron and titanium. As the form of the cathode current collector, examples include, but are not limited to, a foil form, a plate form and a mesh form.

The method for producing the cathode is not particularly limited. As the method, examples include, but are not limited to, the following method: the cathode active material and the lithium phosphate are added and dispersed in a dispersion medium to prepare a slurry, and the slurry is applied onto the cathode current collector, dried and roll-pressed, thereby producing the cathode. The cathode active material and the lithium phosphate may be mixed in advance before they are added in the dispersion medium. The method for mixing them is not particularly limited. As the method, examples include, but are not limited to, mixing by means of a mortar.

The dispersion medium is not particularly limited. As the dispersion medium, examples include, but are not limited to, butyl acetate, heptane and N-methyl-2-pyrrolidone.

As the method for applying the slurry, examples include, but are not limited to, a doctor blade method, a metal mask printing method, an electrostatic coating method, a dip coating method, a spray coating method, a roller coating method, a gravure coating method and a screen printing method.

After the cathode active material layer is formed, the cathode active material layer may be pressed in order to increase electrode density.

The anode includes the anode active material layer comprising the anode active material. In addition to the anode active material layer, the anode generally includes an anode current collector and an anode lead connected to the anode current collector.

The anode active material is not particularly limited, as long as it can occlude and release lithium ions. As the anode active material, examples include, but are not limited to, a lithium metal, a lithium alloy, a metal oxide containing a lithium element, a metal sulfide containing a lithium element, a metal nitride containing a lithium element, a carbonaceous material such as graphite and hard carbon, and Si. Of them, graphite is preferred.

As the lithium alloy, examples include, but are not limited to, a lithium-aluminum alloy, a lithium-tin alloy, a lithium-lead alloy, and a lithium-silicon alloy.

As the metal oxide containing a lithium element, examples include, but are not limited to, a lithium titanium oxide such as $Li_4Ti_5O_{12}$. As the metal nitride containing a lithium element, examples include, but are not limited to, a lithium cobalt nitride, a lithium iron nitride and a lithium manganese nitride. Also, a lithium metal coated with a solid electrolyte may be used.

As needed, anode active material layer may contain a conductive material, a binder, etc.

The details of the conductive material and binder are the same as the conductive material and binder of the above-described cathode active material layer.

The thickness of the anode active material layer is not particularly limited. For example, it may be from 10 to 100 µm or from 10 to 50 µm.

The anode current collector functions to collect current from the anode active material layer. As the raw material for the anode current collector, examples include, but are not limited to, SUS, Cu, Ni, Fe, Ti, Co and Zn.

As the form of the anode current collector, examples include, but are not limited to, the above-described examples of the form of the cathode current collector.

The method for producing the anode is not particularly limited, as long as it is a method by which the anode is obtained. After the anode active material layer is formed, the anode active material layer may be pressed in order to increase electrode density.

The electrolyte layer is disposed between the cathode and the anode and functions to exchange lithium ions between the cathode and the anode.

The electrolyte layer comprises at least a liquid electrolyte.

As the liquid electrolyte, examples include, but are not limited to, a non-aqueous liquid electrolyte and an aqueous liquid electrolyte.

As the non-aqueous liquid electrolyte, generally, one containing a lithium salt and a non-aqueous solvent is used.

As the lithium salt, examples include, but are not limited to, inorganic lithium salts such as $LiPF_6$, $LiBF_4$, $LiClO_4$ and $LiAsF_6$, and organic lithium salts such as $LiCF_3SO_3$, $LiN(SO_2CF_3)_2$ (Li-TFSI), $LiN(SO_2C_2F_5)_2$ and $LiC(SO_2CF_3)_3$.

As the non-aqueous solvent, examples include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof.

The concentration of the lithium salt in the non-aqueous liquid electrolyte is in a range of from 0.5 to 3 mol/L, for example.

As the non-aqueous solvent, for example, an ionic liquid may be used. As the ionic liquid, examples include, but are not limited to, N-methyl-N-propylpiperidinium bis(trifluoromethanesulfonyl)amide (PP13TFSA), N-methyl-N-propylpyrrolidinium bis(trifluoromethanesulfonyl)amide (P13TFSA), N-butyl-N-methylpyrrolidinium bis(trifluoromethanesulfonyl)amide (P14TFSA), N,N-diethyl-N-methyl-N-(2-methoxyethyl)ammonium bis(trifluoromethanesulfonyl)amide (DEMETFSA) and N,N,N-trimethyl-N-propylammonium bis(trifluoromethanesulfonyl)amide (TMPATFSA).

As the aqueous liquid electrolyte, generally, one containing a lithium salt and water is used. As the lithium salt, examples include, but are not limited to, lithium salts such as LiOH, LiCl, $LiNO_3$ and $CH_3CO_2Li$.

The lithium ion secondary battery of the disclosed embodiments may comprise a separator. The separator is disposed between the cathode and the anode. In general, it functions to prevent contact between the cathode active material layer and the anode active material layer and to retain the liquid electrolyte. As the raw material for the separator, examples include, but are not limited to, resins such as polyethylene (PE), polypropylene (PP), polyester, cellulose and polyamide. Of them, polyethylene and/or is preferred.

The separator may have a monolayer structure or a multilayer structure. As the separator having a multilayer structure, examples include, but are not limited to, a separator having a two-layer structure of PE/PP and a separator having a three-layer structure of PP/PE/PP or PE/PP/PE.

In the disclosed embodiments, the separator may be a non-woven fabric such as a resin non-woven fabric or a glass fiber non-woven fabric.

The thickness of the separator is not particularly limited. It is the same as the thickness of a separator used in a common lithium ion secondary battery.

The separator may be impregnated with the above-described liquid electrolyte.

The lithium ion secondary battery of the disclosed embodiments may include a battery casing for storing the cathode, the electrolyte layer, the anode, etc. As the form of the battery casing, examples include, but are not limited to, a coin form, a flat plate form, a cylindrical form and a laminate form.

2. Method for Producing Lithium Ion Secondary Battery

The method for producing the lithium ion secondary battery according to the disclosed embodiments, is a method for producing a lithium ion secondary battery comprising a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, the method comprising: a high-humidity treatment step in which the $Li_3PO_4$ containing an impurity carbonate is prepared and the impurity carbonate is subjected to a hydrolysis treatment in a high-humidity chamber, and a battery assembly step in which the lithium ion secondary battery is assembled after the high-humidity treatment step.

The method for producing the lithium ion secondary battery of the disclosed embodiments includes at least (1) the high-humidity treatment step and (2) the battery assembly step. As needed, it may include (3) a cathode preparation step, etc., before the battery assembly step.

(1) High-Humidity Treatment Step

The high-humidity treatment step is a step in which the $Li_3PO_4$ containing at least $Li_2CO_3$ as the impurity carbonate, is prepared and the impurity carbonate is subjected to the hydrolysis treatment in the high-humidity chamber.

The $Li_3PO_4$ containing the impurity carbonate may be a commercially-available product. In general, a commercially-available product of $Li_3PO_4$ contains at least $Li_2CO_3$ as an impurity carbonate.

The form of the $Li_3PO_4$ is not particularly limited and may be in the form of particles.

When the $Li_3PO_4$ is in the form of particles, the average particle diameter may be 100 nm or more and 20 μm or less.

The C1s element ratio obtained by the X-ray photoelectron spectroscopy measurement of the $Li_3PO_4$ after the high-humidity treatment step, may be 18.82 at % or less. The X-ray photoelectron spectroscopy measurement method is not described here, since it is the same as the method described above under "1. Lithium ion secondary battery".

The high-humidity treatment time is not particularly limited. From the viewpoint of sufficiently hydrolyzing the impurity carbonate, it may be from 25 to 40 hours.

The temperature inside the high-humidity chamber is not particularly limited. From the viewpoint of sufficiently hydrolyzing the impurity carbonate, it may be 60° C. or more and 120° C. or less.

The humidity inside the high-humidity chamber is not particularly limited. From the viewpoint of sufficiently hydrolyzing the impurity carbonate, it may be 90% or more.

The pressure inside the high-humidity chamber is not particularly limited. It may be at the same level as the atmospheric pressure.

The atmosphere of the high-humidity treatment is not particularly limited. It may be the air atmosphere or an inert gas atmosphere such as nitrogen gas and argon gas.

(2) Battery Assembly Step

The battery assembly step is a step in which the lithium ion secondary battery is assembled after the high-humidity treatment step.

The method for assembling the lithium ion secondary battery is not particularly limited, as long as the electrolyte layer is disposed between the cathode and the anode. The cathode, the anode and the liquid electrolyte are prepared in advance before the battery is assembled in the battery assembly step.

The raw materials for the cathode, liquid electrolyte and anode that are prepared in advance before the battery is assembled, are the same as those described above under "1. Lithium ion secondary battery". Accordingly, they are not described here.

(3) Cathode Preparation Step

The cathode preparation step is a step in which the cathode is prepared by mixing the $Li_3PO_4$ with the cathode active material before the battery assembly step. By mixing the cathode active material with the $Li_3PO_4$, the surface area between the liquid electrolyte and the $Li_3PO_4$ can be increased, and the liquid electrolyte decomposition inhibiting ability of the lithium phosphate can be increased.

The cathode preparation step is carried out before the battery assembly step.

Also, the cathode preparation step may be carried out before or after the high-humidity treatment step. From the viewpoint of increased work efficiency, the cathode preparation step may be carried out after the high-humidity treatment step and before the battery assembly step.

In the cathode preparation step, the cathode active material and the $Li_3PO_4$ may be mixed so that the content of the $Li_3PO_4$ in the cathode active material layer is from 0.1 to 10 parts by mass with respect to 100 parts by mass of the cathode active material.

The mixing method is not particularly limited. As the mixing method, examples include, but not limited to, mixing by means of a mortar.

The raw materials used in the cathode preparation step, such as the cathode active material, a conductive material, a binder and a cathode current collector, and the method for producing the cathode are not described here, since they are the same as those described above under "1. Lithium ion secondary battery".

EXAMPLES

Example 1

[High-Humidity Treatment Step]

To hydrolyze impurity carbonate contained in $Li_3PO_4$, the $Li_3PO_4$ was subjected to a high-humidity treatment. The $Li_3PO_4$ was in the form of particles having an average particle diameter of 1 μm. A small amount of the $Li_3PO_4$ particles were put in a petri dish and left in a high-humidity chamber at a temperature of 60° C. and a humidity of 90% for 25 hours.

[Cathode Preparation Step]

$LiNi_{0.5}Mn_{1.5}O_4$ as a cathode active material, the $Li_3PO_4$ subjected to the high-humidity treatment for 25 hours, and acetylene black (AB) as a conductive material, were mixed together. In addition, as a binder, polyvinylidene fluoride (PVdF) dissolved in n-methylpyrrolidone (NMP) was added to the mixture to prepare a slurry. The amount of the $Li_3PO_4$ added was 1 part by mass with respect to 100 parts by mass of the cathode active material. The mixture of the $Li_3PO_4$ and the cathode active material, the mixture being a cathode material, the AB and the PVdF were mixed at a mixing ratio (mass ratio) of 85:10:5. The thus-obtained slurry was applied to an Al foil (15 μm) as a cathode current collector by a doctor blade method, placed in the air and dried at about 80° C. for removal of the NMP. Then, the dried slurry was further dried in vacuum for 10 hours at 120° C. Then, a cathode active material layer thus obtained was attached to the cathode current collector by pressing at 1 ton/cm² (≈98 MPa), thereby producing a coating-type test electrode (cathode). The area of the electrode (in the form of a circle having a diameter of 1.5 cm) was 1.77 cm².

[Battery Assembly Step]

A CR2032-type, two-electrode coin cell (a lithium ion secondary battery) was produced by use of the cathode, a graphite anode and a liquid electrolyte. The graphite anode was an anode containing graphite as an anode active material. The liquid electrolyte was obtained by dissolving lithium hexafluorophosphate ($LiPF_6$) as a supporting salt in a mixed solvent of EC and EMC (mixed at a volume ratio of 3:7) so that the $LiPF_6$ was at a concentration of 1 mol/L.

Example 2

A battery was produced in the same manner as Example 1, except that in the "High-humidity treatment step", the small amount of the $Li_3PO_4$ particles were put in the petri dish and left in the high-humidity chamber at a temperature of 60° C. and a humidity of 90% for 40 hours.

Comparative Example 1

A battery was produced in the same manner as Example 1, except that the "High-humidity treatment step" was not carried out.

[XPS Measurement]

For the $Li_3PO_4$ subjected to the high-humidity treatment for 25 hours (Example 1), the $Li_3PO_4$ subjected to the high-humidity treatment for 40 hours (Example 2) and the $Li_3PO_4$ not subjected to the high-humidity treatment (Comparative Example 1), X-ray photoelectron spectroscopy measurement of elements (C1s, O1s, Li1s and P2p) was carried out to quantitate the ratio of the elements. The results are shown in Table 1. It is considered that the C1s element ratio obtained by the XPS of the $Li_3PO_4$ shown in Table 1, was observed since carbonate was present on the surface of the $Li_3PO_4$ as an impurity, and since other organic components were also present thereon.

As shown in Table 1, the C1s element ratio is 18.82 at % in Example 1, 18.25 at % in Example 2, and 20.52 at % in Comparative Example 1.

Therefore, it is clear that by the high-humidity treatment, the C1s element ratio of the $Li_3PO_4$ surface was reduced compared to the case where the high-humidity treatment was not carried out.

TABLE 1

| | High-temperature treatment time (hr) | Element ratio (at %) | | | |
|---|---|---|---|---|---|
| | | C1s | O1s | Li1s | P2p | Total |
| Example 1 | 25 | 18.82 | 42.25 | 28.47 | 10.46 | 100.00 |
| Example 2 | 40 | 18.25 | 43.05 | 28.25 | 10.45 | 100.00 |
| Comparative Example 1 | 0 | 20.52 | 41.49 | 27.68 | 10.31 | 100.00 |

[Evaluation]

The batteries were evaluated as follows. Hereinafter, current value unit "C" indicates a current value that a battery can discharge its rated capacity in one hour. Also, "CC" indicates constant current.

[Initial Discharge Capacity Measurement]

An initial charge-discharge test was carried out by use of the batteries of Example 1, Example 2 and Comparative Example 1. In this measurement, a test electrode was determined as a cathode; a Li metal was determined as an anode; a process of extracting $Li^+$ from the test electrode was determined as "charge"; and a process of inserting $Li^+$ into the test electrode was determined as "discharge". As a measurement device, charge-discharge tester HJ-1001 SM8A (product name, manufactured by Hokuto Denko Corporation) was used.

In a voltage range of from 3.5 V to 4.9 V, the battery was charged and discharged three times at a 1C rate.

Then, the discharge capacity after the three cycles was determined as initial charge capacity.

Then, initial resistance measurement of the battery was carried out.

The 1C rate was calculated as follows: one cycle of charge and discharge of the battery was carried out at a current value of 0.2 mA/cm², in a voltage range of from 3.5 V to 5 V, and at a temperature of 25° C. to measure the capacity of the battery, and the 1C rate was calculated from the measured battery capacity.

[Initial Resistance Measurement]

At 25° C., the state of charge (SOC) of the battery was controlled to 60%. Then, the battery was left to stand for 30 minutes. At 25° C., constant current (CC) discharge of the battery was carried out at a 1C rate (ΔI) for 10 seconds to measure the voltage decrease amount (ΔV) of the battery. From the current value and the voltage decrease amount, the resistance of the battery was calculated. Then, constant current (CC) discharge of the battery was carried out for 10 seconds at a 3C rate and a 5C rate. In the same manner as above, the resistance of the battery was calculated, and the average of the thus-obtained resistance values was determined as initial resistance. The results are shown in Table 2.

[Battery Durability Test]

Then, in an environment at a 2C rate and a temperature of 60° C., 200 cycles of charge and discharge of the battery were carried out in a voltage range of from 3.5 V to 5 V.

Then, the temperature of the environment was returned to 25° C. In the same charge-discharge condition as the above "Initial discharge capacity measurement" (that is, at a 1C rate and in a range of from 3.5 V to 4.9 V), one cycle of charge and discharge of the battery was carried out to measure the discharge capacity after the durability test.

Then, the capacity retention rate (%) was calculated by the following formula. The results are shown in Table 2.

Capacity retention rate=(Discharge capacity after the durability test/Initial discharge capacity)×100

TABLE 2

|  | High-temperature treatment time (hr) | Initial resistance (Ω) | Capacity retention rate (%) |
| --- | --- | --- | --- |
| Example 1 | 25 | 20.9 | 63.4 |
| Example 2 | 40 | 20.1 | 61.9 |
| Comparative Example 1 | 0 | 21.4 | 59.0 |

[Results]

Table 2 shows the battery performance of the battery comprising the $Li_3PO_4$ subjected to the high-humidity treatment for 25 hours (Example 1), the battery performance of the battery comprising the $Li_3PO_4$ subjected to the high-humidity treatment for 40 hours (Example 2), and the battery performance of the battery comprising the $Li_3PO_4$ not subjected to the high-humidity treatment (Comparative Example 1).

As shown in Table 2, the initial resistance is 20.9Ω in Example 1, 20.1Ω in Example 2, and 21.4Ω in Comparative Example 1.

As shown in Table 2, the capacity retention rate is 63.4% in Example 1, 61.9% in Example 2, and 59.0% in Comparative Example 1.

Therefore, it was confirmed that by carrying out the high-humidity treatment, compared to the case in which the high-humidity treatment was not carried out, the initial resistance decreased by 2.3 to 6.1%, and the capacity retention rate increased by 2.9 to 4.4%. It is considered that this is because, since the carbonate on the $Li_3PO_4$ surface was hydrolyzed by the high-humidity treatment, formation of a coating film on the cathode active material surface by the carbonate, was inhibited at the time of initial charging.

The invention claimed is:

1. A method for producing a lithium ion secondary battery comprising a cathode including a cathode active material layer comprising a cathode active material and $Li_3PO_4$, an anode including an anode active material layer comprising an anode active material, and an electrolyte layer being disposed between the cathode and the anode and comprising a liquid electrolyte, the method comprising:
   a hydrolysis treatment step in which the $Li_3PO_4$ containing an impurity carbonate is prepared and the impurity carbonate is subjected to a hydrolysis treatment in a high-humidity chamber,
   a cathode preparation step in which the cathode is prepared by mixing the $Li_3PO_4$ with the cathode active material, and
   a battery assembly step in which the lithium ion secondary battery is assembled, wherein
      the cathode preparation step occurs after the hydrolysis treatment step and before the battery assembly step, and
      the battery assembly step occurs after the hydrolysis treatment step.

2. The method for producing the lithium ion secondary battery according to claim 1, wherein the hydrolysis treatment is carried out for 25 to 40 hours in the hydrolysis step.

3. The method for producing the lithium ion secondary battery according to claim 1, wherein the hydrolysis treatment is carried out in the high-humidity chamber at a temperature of 60° C. or more and 120° C. or less and a humidity of 90% or more in the hydrolysis treatment step.

4. The method for producing the lithium ion secondary battery according to claim 1, wherein the $Li_3PO_4$ is particles having an average particle diameter of 100 nm or more and 20 μm or less.

5. The method for producing the lithium ion secondary battery according to claim 1, wherein a C1s element ratio obtained by X-ray photoelectron spectroscopy measurement of the $Li_3PO_4$ after the hydrolysis treatment step, is 18.25 at % or more and 18.82 at % or less.

6. The method for producing the lithium ion secondary battery according to claim 1, wherein the liquid electrolyte contains a non-aqueous solvent.

7. The method for producing the lithium ion secondary battery according to claim 1, wherein a content of the $Li_3PO_4$ in the cathode active material layer is from 0.1 to 10 parts by mass with respect to 100 parts by mass of the cathode active material.

* * * * *